(12) United States Patent
Sugiura

(10) Patent No.: US 10,643,348 B2
(45) Date of Patent: May 5, 2020

(54) INFORMATION PROCESSING APPARATUS, MOVING OBJECT, INFORMATION PROCESSING METHOD, AND COMPUTER PROGRAM PRODUCT

(71) Applicant: Kabushiki Kaisha Toshiba, Minato-ku (JP)

(72) Inventor: Takayuki Sugiura, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 50 days.

(21) Appl. No.: 15/914,404

(22) Filed: Mar. 7, 2018

(65) Prior Publication Data

US 2018/0365854 A1 Dec. 20, 2018

(30) Foreign Application Priority Data

Jun. 16, 2017 (JP) .................................. 2017-118798

(51) Int. Cl.
  *G06T 7/73* (2017.01)
  *G06T 7/246* (2017.01)
  *G06K 9/00* (2006.01)

(52) U.S. Cl.
  CPC ............ *G06T 7/73* (2017.01); *G06K 9/00201* (2013.01); *G06K 9/00791* (2013.01); *G06K 9/00805* (2013.01); *G06T 7/246* (2017.01)

(58) Field of Classification Search
  CPC ........... G06K 9/00201; G06K 9/00791; G06K 9/00805; G06T 7/73; G06T 7/246
  See application file for complete search history.

(56) References Cited

U.S. PATENT DOCUMENTS

| 8,717,225 | B2 | 5/2014 | Sasabuchi | |
|---|---|---|---|---|
| 2017/0061219 | A1* | 3/2017 | Shin | .......................... G06T 7/60 |
| 2017/0294124 | A1 | 10/2017 | Baba | |
| 2017/0345180 | A1 | 11/2017 | Sugiura | |

FOREIGN PATENT DOCUMENTS

| JP | 2005-9881 | 1/2005 |
|---|---|---|
| JP | 5396475 | 1/2014 |
| JP | 5698597 | 4/2015 |
| JP | 2016-65760 | 4/2016 |
| JP | 2017-215161 | 12/2017 |

OTHER PUBLICATIONS

Hyunggi Cho et al. "A Multi-Sensor Fusion System for Moving Object Detection and Tracking in Urban Driving Environments," IEEE International Conference on Robotics & Automation (ICRA), Hong Kong Convention and Exhibition Center, 2014, pp. 8.

* cited by examiner

*Primary Examiner* — Leon Flores
(74) *Attorney, Agent, or Firm* — Oblon, McClelland, Maier & Neustadt, L.L.P.

(57) ABSTRACT

According to an embodiment, an information processing apparatus includes one or more processors. The one or more processors are configured to detect an end point in a point cluster that constitutes a first object; and specify the end point as a reference point of the first object when a second object that is more distant than the end point from the apparatus is present within a neighboring region of the end point.

19 Claims, 12 Drawing Sheets

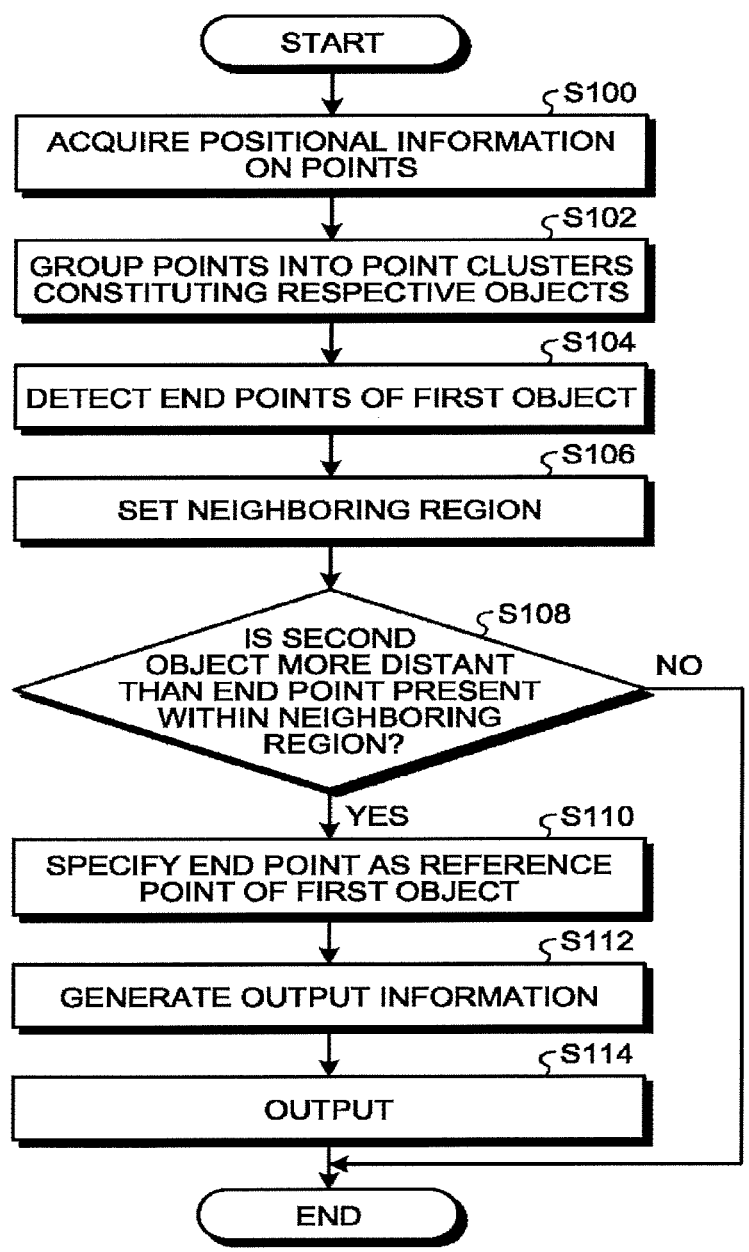

INFORMATION PROCESSING APPARATUS, MOVING OBJECT, INFORMATION PROCESSING METHOD, AND COMPUTER PROGRAM PRODUCT

CROSS-REFERENCE TO RELATED APPLICATIONS

This application is based upon and claims the benefit of priority from Japanese Patent Application No. 2017-118798, filed on Jun. 16, 2017; the entire contents of which are incorporated herein by reference.

FIELD

Embodiments described herein relate to an information processing apparatus, a moving object, an information processing method, and a computer program product.

BACKGROUND

Techniques for specifying a reference point of an object for calculating the position and the moving speed of the object have been disclosed.

For example, a technique to detect two opposite end points of an object near a subject vehicle in the horizontal direction and use, as a reference point of the object, any one of the end points that is not behind another object has been disclosed. However, an end point of an object is inaccurately detected not only when the end point is behind another object but also when the material or the surface shape of the object or the positional relation thereof with a sensor is unfavorable for the detection. Therefore, when an end point of an object is inaccurately detected not because the end point is behind another object but because of another factor, a reference point of the object may be inaccurately detected. That is, conventionally, it has been difficult to highly accurately specify a reference point of an object.

BRIEF DESCRIPTION OF THE DRAWINGS

FIG. 6 is a flowchart illustrating an example of a procedure for information processing.

DETAILED DESCRIPTION

According to an embodiment, an information processing apparatus includes one or more processors. The one or more processors are configured to detect an end point in a point cluster that constitutes a first object; and specify the end point as a reference point of the first object when a second object that is more distant than the end point from the apparatus is present within a neighboring region of the end point.

The following describes an information processing apparatus, a moving object, an information processing method, and a computer program product in detail with reference to the accompanying drawings.

First Embodiment

Figure 1:
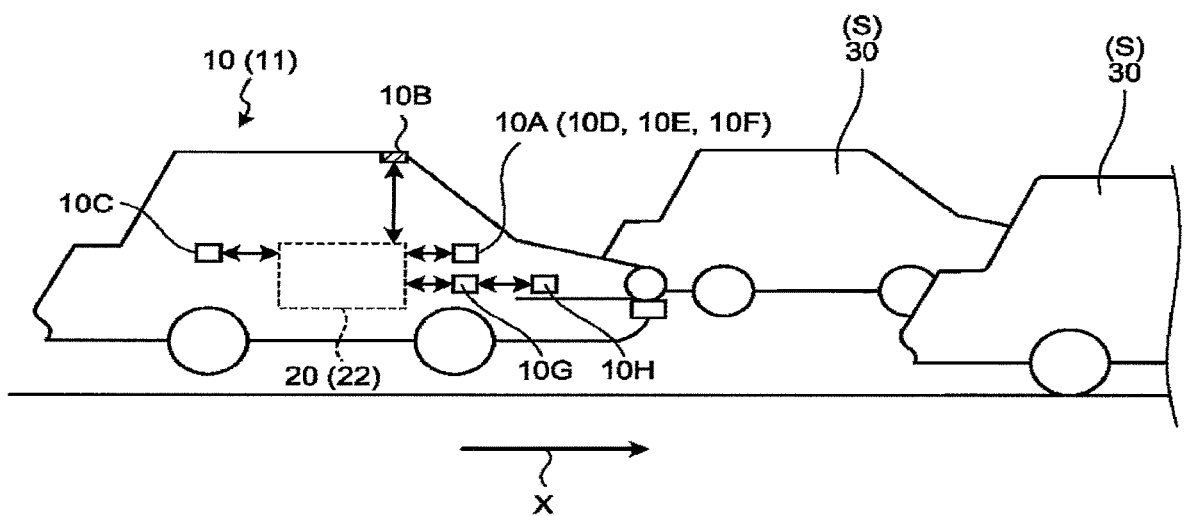
FIG. 1 illustrates an example of a moving object of one embodiment.

FIG. 1 illustrates an example of a moving object 10 of this embodiment. For example, the moving object 10 travels in a traveling direction (a direction indicated by the arrow X).

The moving object 10 includes an information processing apparatus 20, an output unit 10A, a sensor 10B, an input device 10C, a power controller 10G, and a power unit 10H.

The information processing apparatus 20 is, for example, a dedicated or general-purpose computer. In this embodiment, a case where the information processing apparatus 20 is installed on the moving object 10 is explained as an example.

The moving object 10 is an object capable of moving. Examples of the moving object 10 include vehicles (a motor cycle, a four-wheel automobile, and a bicycle), a bogie, a robot, a marine vessel, and flying vehicles (an airplane and an unmanned aerial vehicle (UAV)). The moving object 10 is, for example, a moving object that travels by being operated by a person, or a moving object capable of automatically traveling (autonomous travel) without being operated by a person. Examples of the moving object capable of automatically traveling include a self-driving vehicle. Descriptions of this embodiment assume that the moving object 10 is a vehicle capable of autonomous travel, as an example.

The information processing apparatus 20 is not limited to being installed on the moving object 10. The information processing apparatus 20 may be installed on a stationary object. The stationary object is an object incapable of moving or an object that is being stationary relative to the ground. Examples of the stationary object include a guardrail, a pole, a parked vehicle, and a road sign. Alternatively, the information processing apparatus 20 may be installed on a cloud server that executes processing on a cloud.

In this embodiment, the information processing apparatus 20 specifies a reference point S of an object 30.

The object 30 is an object having the reference point S to be specified by the information processing apparatus 20. More precisely, the object 30 is an object that is present in an environment external to a sensor 10B (described later) and that is to be observed by the sensor 10B.

The object 30 may be either a moving object or a stationary object. Definitions of the moving object and the stationary object are the same as those of the foregoing moving object and stationary object. The object 30 may be either a living object or a non-living object. Examples of the living object include a person, an animal, and a plant. Examples of the non-living object include a vehicle, an object capable of flying, and a robot.

The reference point S of the object 30 is a point that indicates the object 30. The reference point S of the object 30 is used, for example, for deriving the position and the moving speed of the object 30. The reference point S of the object 30 may be used as the position of the object 30. In this embodiment, the information processing apparatus 20 specifies the reference point S of the object 30. A process for specifying the reference point S is to be described later in detail.

The sensor 10B acquires observed information on an environment external thereto. The observed information is information that indicates results of observation on the surroundings of a location in which the sensor 10B is installed. In this embodiment, the observed information is information from which respective pieces of positional information on a plurality of points surrounding the sensor 10B can be derived.

The points are points to be detected by the sensor 10B. The pieces of positional information are information that indicates distances and directions to the respective points from the sensor 10B. These distances and directions can be expressed using expressions such as positional coordinates that indicate positions of the points relative to the sensor 10B, positional coordinates that indicate absolute positions of the points, and/or vectors.

The respective points represent detection points in an environment external to the sensor 10B that are to be individually observed by the sensor 10B. For example, the sensor 10B emits light to the surroundings of the sensor 10B, and receives reflected light reflected by reflection points. These reflection points correspond to the points. A plurality of reflection points may be used together as one of the points.

The sensor 10B acquires observed information including: the directions of light emission to the respective points (the directions to the respective points from the sensor 10B); and information on reflected light reflected by the respective points. Examples of the information on the reflected light include elapsed times from light emission to reception of reflected light, the intensities of received light (or the attenuation rates of the intensities of received light to the corresponding intensities of emitted light). The processor 20A described later derives the distances from the sensor 10B to the points by use of this information including the elapsed times.

Examples of the sensor 10B include an image capturing apparatus and distance sensors (a millimeter-wave radar and a laser sensor). The image capturing apparatus acquires captured image data (hereinafter referred to as captured images) by capturing images. Examples of the captured image data include digital image data having pixel values assigned to each pixel, and depth maps each having distances from the sensor 10B assigned to each pixel. Examples of the laser sensor include a two-dimensional laser imaging detection and ranging (LIDAR) sensor that is set parallel to a horizontal plane, and a three-dimensional LIDAR sensor.

Such a LIDAR sensor emits laser light in a pulsed manner to the surroundings thereof, and receives the laser light that is reflected by a point on the object 30. For example, the LIDAR sensor scans the surroundings thereof with laser light in a scanning direction to irradiate the surroundings with laser light. Examples of the scanning direction include the horizontal direction and the vertical direction. That is, the LIDAR sensor scans the surroundings thereof with laser light and receives reflected light of the laser light with respect to each light emission direction in the scanning direction. Another scanning direction may be further employed.

The LIDAR sensor acquires observed information including: directions of laser light emission; and elapsed times from the laser light emission to reception of reflected light thereof. The processor 20A described later then calculates the distances between the sensor 10B and the respective points, based on the elapsed times included in the observed information on the respective points. Thus, the processor 20A described later acquires the positional information on the respective points (details of the acquisition are described later). Alternatively, the LIDAR sensor (the sensor 10B) may calculate the distances between the sensor 10B and the points in the respective directions of laser light emission, based on the directions of emission and the elapsed times from laser light emission and the reception of reflected light thereof. That is, the LIDAR sensor (the sensor 10B) may calculate the positional information on the respective points.

In this embodiment, a case where the sensor 10B is a two-dimensional LIDAR sensor is explained as an example. Alternatively, the sensor 10B may be a three-dimensional LIDAR sensor. Optionally, the sensor 10B may be configured to acquire observed information on respective faces constituting the surface of the object 30. Optionally, the sensor 10B may be configured to acquire captured images that have been captured from a plurality of different directions. The information processing apparatus 20 may include a plurality of such sensors 10B. In such a case, these sensors 10B in the information processing apparatus 20 may all belong to a single type, or may belong to two or more types. When the information processing apparatus 20 includes a plurality of such sensors 10B, the processor 20A described later may only use integral information as the observed information, the integral information having been obtained by integrating observed information acquired by these sensors 10B.

The output unit 10A outputs various kinds of information. In this embodiment, the output unit 10A outputs output information. The output information is generated by the information processing apparatus 20 (the generation is described later in detail). The output information includes information on the reference point S of the object 30. Specifically, the output information includes: information indicating the position of the reference point S of the object 30; and at least one attribute of the object 30 among the moving direction, the moving distance, the moving speed, the shape, and the position thereof, the at least one attribute having been derived based on the reference point S. The information indicating the position of the reference point S of the object 30 may be a position relative to the sensor 10B or may be an absolute position.

For example, the output unit 10A includes: a communication function for transmitting the output information; a display function for displaying the output information; and an audio output function for outputting sound indicating the output information. For example, the output unit 10A includes a communication unit 10D, a display 10E, and a loudspeaker 10F.

The communication unit 10D transmits the output information to an apparatus other than the information processing apparatus 20. For example, the communication unit 10D transmits the output information through a publicly known communication line. The display 10E displays the output information. The display 10E is, for example, a publicly known display such as a liquid crystal display (LCD), a projection device, or a lighting device. The loudspeaker 10F outputs sound indicating the output information.

The input device 10C receives various instructions and information input from a user. The input device 10C may be, for example, a pointing device such as a mouse or a track ball, or an input device such as a keyboard.

The power unit 10H is a device that drives the moving object 10. The power unit 10H is, for example, an engine, a motor, or a wheel.

The power controller 10G controls the power unit 10H. The power unit 10H is driven under the control of the power controller 10G. For example, the power controller 10G determines the conditions of the surroundings based on the output information generated by the information processing apparatus 20 and information obtained from the sensor 10B, and controls variables such as the acceleration level, the braking pressure level, and the steering angle. For example, the power controller 10G performs control so that the moving object 10 can keep the current lane while avoiding obstacles and keep being at least a certain distance apart from a vehicle in front thereof.

Figure 2:
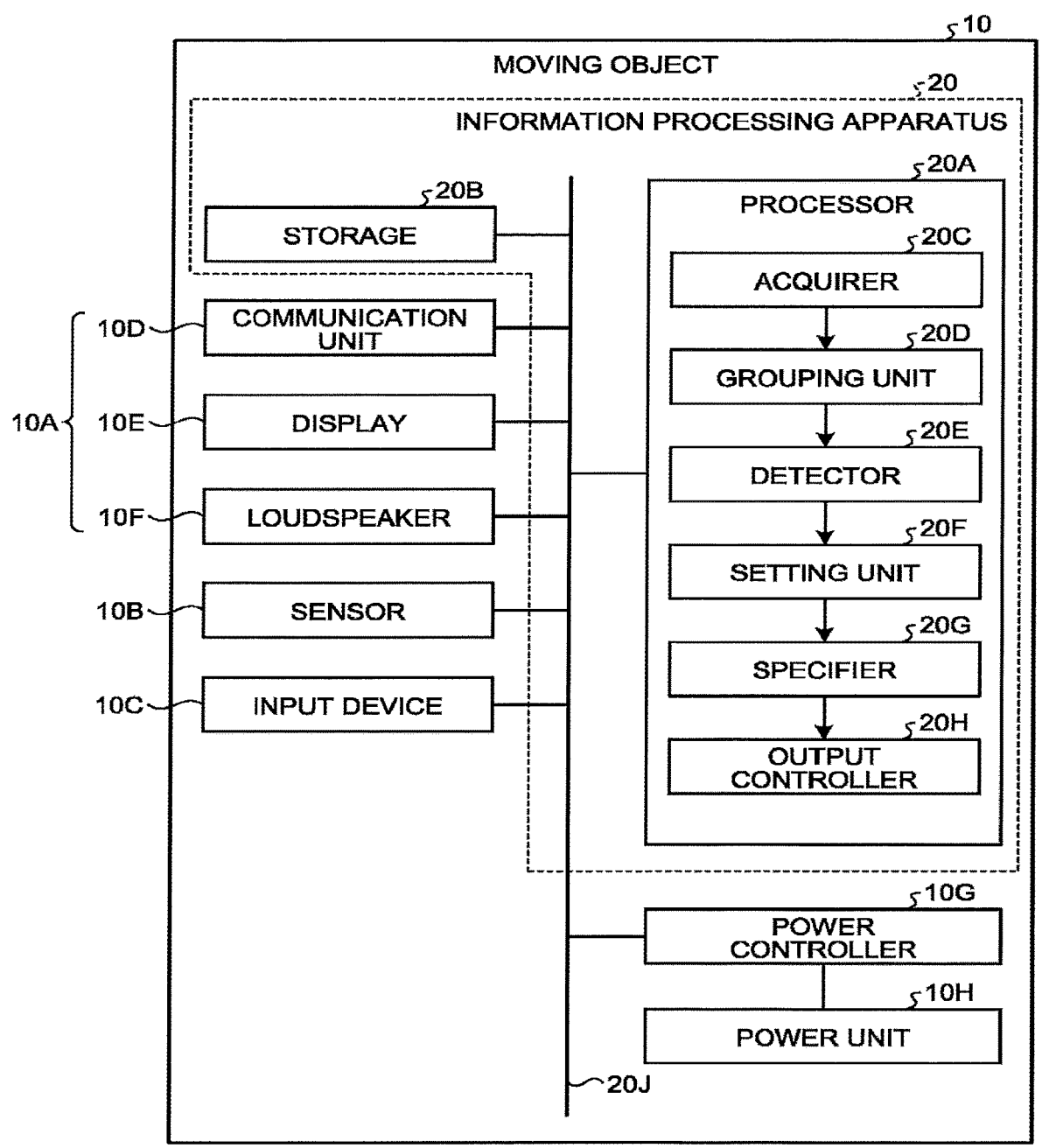
FIG. 2 is a block diagram illustrating an example of the configuration of an information processing apparatus.

The configuration of the information processing apparatus 20 is described next. FIG. 2 is a block diagram illustrating an example of the configuration of the information processing apparatus 20.

The information processing apparatus 20 specifies the reference point S of the object 30. The information processing apparatus 20 is, for example, a dedicated or general-purpose computer. The information processing apparatus 20 includes the processor 20A and a storage 20B.

The processor 20A, the storage 20B, the output unit 10A, the sensor 10B, and the input device 10C are connected via a bus 20J. The storage 20B, the output unit 10A (the communication unit 10D, the display 10E, and the loudspeaker 10F), and the sensor 10B, and the input device 10C may only be connected to the processor 20A in wired or wireless manners. At least one of the storage 20B, the output unit 10A (the communication unit 10D, the display 10E, the loudspeaker 10F), the sensor 10B, and the input device 10C may be connected to the processor 20A through a network.

The storage 20B stores therein various kinds of data. The storage 20B is, for example, a semiconductor memory device such as a random access memory (RAM) or a flash memory, a hard disk, or an optical disc. The storage 20B may be a storage device provided external to the information processing apparatus 20. The storage 20B may be a storage medium. Specifically, the storage medium may be a medium that stores or temporarily stores therein a computer program and/or various kinds of information downloaded through a local area network (LAN) or the Internet. The storage 20B may be composed of a plurality of storage media.

This embodiment is further described with reference back to FIG. 2. The processor 20A is described next. The processor 20A includes an acquirer 20C, a grouping unit 20D, a detector 20E, a setting unit 20F, a specifier 20G, and an output controller 20H.

The storage 20B has individual processing functions in the processor 20A stored therein in the form of computer-executable computer programs. The processor 20A is a processor that implements functions corresponding to the computer programs by loading, from the storage 20B, and executing the respective computer programs.

As a consequence of having the computer programs thus loaded, the processor 20A includes the corresponding functional units illustrated in the processor 20A of FIG. 2. Descriptions regarding FIG. 2 assume that a single such processor 20A implements the acquirer 20C, the grouping unit 20D, the detector 20E, the setting unit 20F, the specifier 20G, and the output controller 20H.

The processor 20A may include, in combination, a plurality of mutually independent processors for implementing the respective functional units. In such a case, the respective processors implement the corresponding functional units by executing the corresponding computer programs. Alternatively, the respective functional units may be provided as computer programs with a single processing circuit configured to execute these computer programs, or at least one particular functional unit may each be implemented in a dedicated independent program-executing circuit.

As used in this embodiment and the following embodiment, the term "processor" refers to, for example, a central processing unit (CPU), a graphics processing unit (GPU), an application specific integrated circuit (ASIC), or a circuit for a programmable logic device (such as a simple programmable logic device (SPLD), a complex programmable logic device (CPLD), or a field programmable gate array (FPGA)).

The processor implements a function by loading and executing a computer program stored in the storage 20B. Alternatively, the computer program may be incorporated directly in a circuit in a processor instead of being stored in the storage 20B. In such a case, the processor implement the function by loading and executing a computer program incorporated in the circuit.

The acquirer 20C acquires respective pieces of positional information on a plurality of points surrounding the moving object 10.

The acquirer 20C acquires observed information on the surroundings of the sensor 10B from the sensor 10B. As described above, the observed information is information observed regarding an environment external to the sensor 10B, and is information from which the positional information on the respective points surrounding the sensor 10B can be derived. The acquirer 20C derives the positional information on the respective points, based on the observed information. Thus, the acquirer 20C acquires the positional information on the respective points.

Specifically, it is assumed herein that the sensor 10B is a LIDAR sensor. On that assumption, the acquirer 20C acquires, as the observed information, directions of laser light emission from the sensor 10B, and elapsed times from the laser light emission to reception of reflected light thereof. The acquirer 20C then calculates the distances between the sensor 10B and the respective points, based on the elapsed times. Thus, the acquirer 20C acquires positional information on respective points detected by the sensor 10B, the positional information indicating: the distances from the sensor 10B to these points; and directions to these points from the sensor 10B.

As described above, when a LIDAR sensor is used as the sensor 10B, the sensor 10B may calculate the positional information (the directions of the emission and the distances) based on the directions of laser light emission and the elapsed times from the laser light emission to the reception of reflected light thereof. In such a case, the acquirer 20C may only acquire the positional information on the respective points from the sensor 10B (a LIDAR sensor).

As described above, the sensor 10B can be configured to acquire observed information on respective faces constituting the surface of the object 30. In such a case, the acquirer 20C may only acquire positional information on respective points by projecting the respective different faces indicated in the observed information onto a horizontal plane. The sensor 10B can be configured to acquire captured images that have been captured from a plurality of different directions. In such a case, the acquirer 20C may only estimate three-dimensional positional information on respective detection points by reconstructing, from depth information (distance information) on the respective detection points based on captured images captured from a plurality of directions and acquired from the sensor 10B. A plurality of such sensors 10B can be included instead of the single sensor 10B. In such a case, the acquirer 20C may only integrate the observed information acquired by these respective sensors 10B into integral information and use this integral information to acquire positional information on points.

Figure 3A:
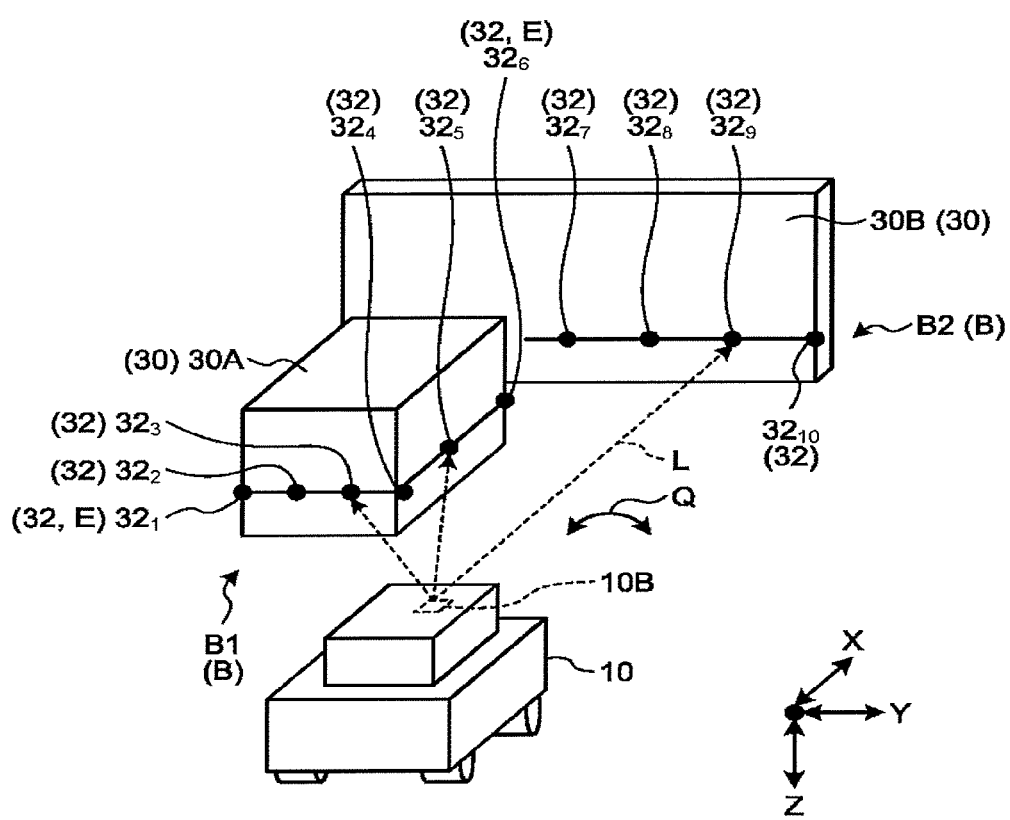
FIG. 3A illustrates an example of processing to be performed by a processor.

FIG. 3A illustrates an example of processing to be performed by the processor 20A. For example, the sensor 10B installed on the moving object 10 emits laser light L to the surroundings of the sensor 10B, and receives reflected light reflected by the objects 30 (objects 30A and 30B) in the surroundings of the sensor 10B. Thus, the sensor 10B acquires observed information on points 32 (for example, points $32_1$ to $32_{10}$) that correspond to reflection points of the objects 30 (the objects 30A and 30B). The positions of the objects 30, the number of such objects 30, the number of such points 32, and the positions of the points 32 are exemplary, and are not limited to the implementation illustrated in FIG. 3A.

The acquirer 20C then derives positional information on the respective points 32 (for example, the points $32_1$ to $32_{10}$), based on the observed information.

This embodiment is further described with reference back to FIG. 2. The grouping unit 20D groups, into point clusters (sets of points) that constitute the respective objects 30, the points 32 on which the positional information has been obtained by the acquirer 20C.

The descriptions below refer to FIG. 3A. Specifically, based on the positional information on the respective points 32, the grouping unit 20D groups these points 32 into point clusters B that constitute the respective objects 30. FIG. 3A illustrates an example in which a plurality of such points 32 (for example, points $32_1$ to $32_{10}$) into a point cluster B1 consisting of the points $32_1$ to $32_6$ and a point cluster B2 consisting of the points $32_7$ to $32_{10}$.

It is herein assumed that the sensor 10B is a two-dimensional LIDAR sensor, for example. In this case, the grouping unit 20D sequentially assigns numbers to (sets up the order of) the respective points 32 along a circumferential direction of a circle on a horizontally spreading two-dimensional plane, the circle being centered at the sensor 10B.

The information processing apparatus 20 then determines, in the ascending order of the assigned numbers, whether each of the points 32 constitutes the same object 30 as the immediately preceding point 32 has been determined to constitute. For example, if the difference between the distance (to the sensor 10B) indicated by the positional information on the immediately preceding point 32 and the distance indicated by the positional information on the point 32 currently under determination is smaller than or equal to a threshold, the grouping unit 20D determines that these points 32 constitute the same object 30. The grouping unit 20D sequentially determines whether the points 32 constitute the same object 30, until determining that any one of the points 32 does not. A cluster of the points 32 determined to constitute the same object 30 are grouped as the point cluster B that constitutes one of the objects 30.

In the example illustrated in FIG. 3A, this grouping process groups the points 32 ($32_1$ to $32_{10}$) into at least one point cluster B (point clusters B1 and B2) that constitutes the object 30.

A grouping manner that the grouping unit 20D employs is not limited to the above manner. More precisely, the above described grouping process is performed on the points 32 in order of position along a circumferential direction of a circle on a two-dimensional plane, the circle being centered at the sensor 10B. However, a manner for setting the order of the points 32 is not limited to this manner.

A criterion for determining whether the points 35 constitute the same object 30 is not limited to the above criterion. For example, the grouping unit 20D may use positional coordinates that indicate positions of the points 32 relative to the sensor 10B, or the absolute positions of the points 32. Alternatively, the grouping unit 20D may determine, to determine whether the point 32 that is currently under determination constitutes one of the objects 30, whether the distance to that point 32 from each of the points 32 that have been already determined to constitute that same one object 30 is smaller than or equal to a threshold. Alternatively, the grouping unit 20D may determine, using the intensities of reflected light that are included in the observed information on the points 32, whether the points 35 constitute the same object 30.

This embodiment is further described with reference back to FIG. 2. The detector 20E detects an end point of the point cluster B that constitutes a first object.

The first object is an object 30 on which a reference point S is to be specified among the objects 30 subjected to the grouping by the grouping unit 20D. This embodiment is described using the term "second object" when referring to any object 30, other than the first object, among the objects 30 subjected to the grouping by the grouping unit 20D.

For example, the detector 20E specifies, as the object 30 (hereinafter referred to as first object 30A) that includes a reference point S to be specified, one of the objects 30 subjected to the grouping by the grouping unit 20D. The detector 20E then treats, as a second object (hereinafter referred to as second object 30B), any object 30 among the objects 30 subjected to the grouping by the grouping unit 20D, other than the first object 30A.

The detector 20E may sequentially specify one by one, as the first objects 30A, the objects 30 subjected to the grouping by the grouping unit 20D and then perform processing for detecting end points thereof. In such a case, the objects 30 other than one of the objects 30 that has been determined as the first object 30A may be treated as the second objects 30B, and processing described later may only be performed thereon.

The descriptions below refer to FIG. 3A. The detector 20E detects end points E from among the points 32 ($32_1$ to $32_6$) forming the point cluster B1 that constitutes the first object 30A.

The end points E are points located at the respective ends, in a certain direction, of the points 32 ($32_1$ to $32_6$) forming the point cluster B1 that constitutes the first object 30A.

The certain direction that is used for detection of the end points E is, for example, the scanning direction of the sensor 10B. For example, the scanning direction of the sensor 10B is assumed as a horizontal direction (refer to the scanning direction Q in FIG. 3A). The horizontal direction is a direction along a two-dimensional plane (the X-Y plane) that is perpendicular to the vertical direction (the arrow-Z direction). This two-dimensional plane is, specifically, a plane formed by the X direction and the Y direction that are both perpendicular to the vertical directions (the arrow-Z direction) and are perpendicular to each other. In this case, the detector 20E detects, as the end points E, the points 32 ($32_1$ and $32_6$) located at the respective ends, in the scanning direction Q of the sensor 10B, of the points 32 ($32_1$ to $32_6$) forming the point cluster B1 that constitutes the first object 30A.

The scanning direction Q of the sensor 10B can be the vertical direction. In such a case, the detector 20E may only detect, as the end points E, the points 32 located at the respective ends, in the vertical direction set as the scanning direction Q of the sensor 10B, of the points 32 forming the point cluster B1 that constitutes the first object 30A. A plurality of scanning directions (the vertical direction, a horizontal direction, and a direction perpendicular to these directions) can be set as the scanning directions of the sensor 10B. In such a case, the detector 20E may only detect, as the end points E, the points 32 located at the respective ends, in each of these scanning directions Q of the sensor 10B, of the points 32 forming the point cluster B1 that constitutes the first object 30A.

For this reason, the number of end points E that the detector 20E detects from the first object 30A is not limited to two. For example, the detector 20E may detect three or more such end points E.

The certain direction that is used for detection of the end points E is not limited to the scanning direction Q of the sensor 10B. For example, a direction in which the points 32 ($32_1$ to $32_6$) forming the point cluster B1 that constitutes the first object 30A are distributed may be used as the certain direction.

In such a case, the detector 20E may only detect, as the end points E, the points 32 ($32_1$ and $32_6$, for example) located at the respective ends, in the direction in which the points 32 forming the point cluster B1 that constitutes the first object 30A, of the points 32 ($32_1$ to $32_6$) forming the point cluster B1, are distributed.

This embodiment is further described with reference back to FIG. 2. The setting unit 20F sets a neighboring region of each of the end points E. The neighboring region is a region within a certain range from the end point E. For example, the neighboring region may be a region in the neighborhood of a point, on a first face or a second face, corresponding to the end point E when the first object 30A and the second objects 30B are projected onto the first face or the second face with the center of the projection being the sensor 10B.

Figure 3B:
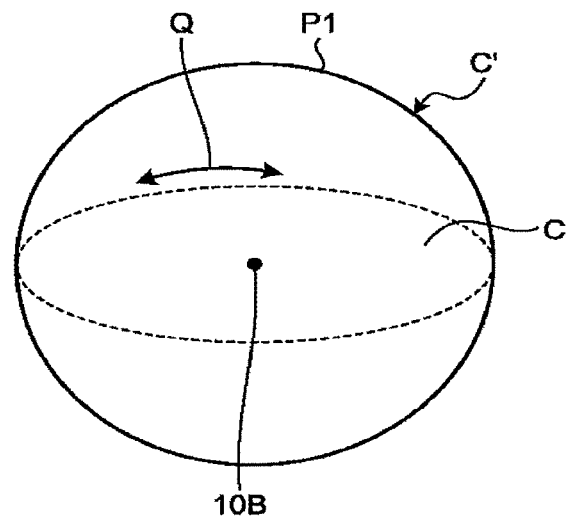
FIG. 3B illustrates a first face.

FIG. 3B illustrates the first face P1. The first face P1 is a face spreading along the scanning direction Q of the sensor 10B detecting the points 32. More precisely, the first face P1 is a face along the curved surface of the outer circumference of a sphere C' formed with a section shaped as a circle C drawn along the scanning direction Q with 360-degree rotation about the sensor 10B. This outer circumference refers to a part of the sphere, the part corresponding to the curved surface thereof.

Figure 3C:
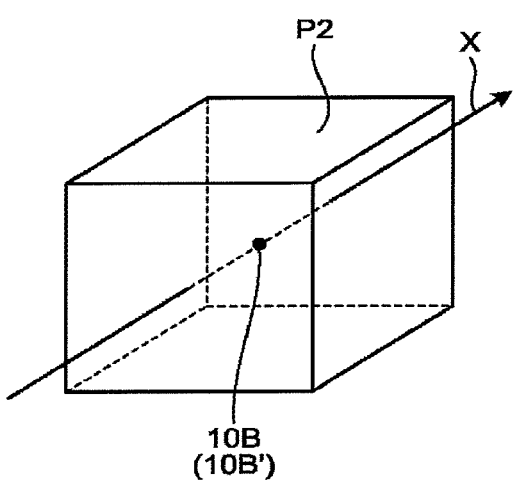
FIG. 3C illustrates a second face.

FIG. 3C illustrates a second face P2. The second face P2 is a face of a cube with the sensor 10B as the center of the cube, and the second face P2 is in parallel to a light exit face 10B' of the sensor 10B. For example, the sensor 10B has the light exit face 10B' set to a face thereof that intersects a traveling direction X of the moving object 10. The second face P2 is a two-dimensional plane parallel to this light exit face 10B'.

Figure 4:
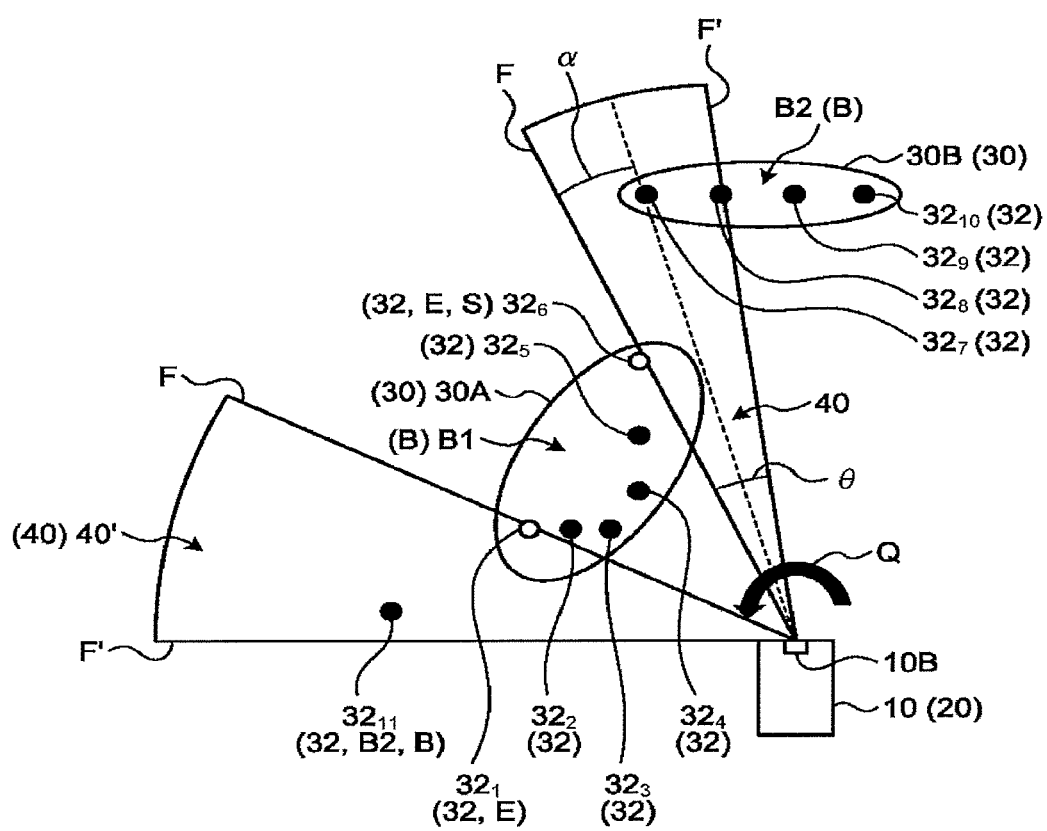
FIG. 4 illustrates setting of neighboring regions.

FIG. 4 illustrates setting of neighboring regions 40, and is a top view looking down, vertically from above, the state illustrated in FIG. 3A. In this embodiment, the setting unit 20F sets, as each of the neighboring regions 40, a range of a certain angle θ from each reference straight line F toward the outside of the first object 30A.

The reference straight line F is a straight line passing through the moving object 10 and the corresponding end point E (the point $32_6$ in FIG. 4). Specifically, the reference straight line F is a straight line passing through a light-receiving surface of the sensor 10B installed on the moving object 10 and the end point E.

The outside of the first object 30A herein means one side of first object 30A from the end point E (the point $32_6$ in FIG. 4), the one side having none of the points 32 that form the point cluster B1 that constitutes the first object 30A.

Therefore, the neighboring region 40 is a region sandwiched between two straight lines extending from the sensor 10B that are: the reference straight line F passing through the sensor 10B and the end point E (the point $32_6$); and a straight line F' indicating the certain angle θ from the reference straight line F toward the outside of the first object 30A.

The neighboring region 40 may only be a region that is a range of the certain angle θ from the reference straight line F toward the outside of the first object 30A in at least one of the horizontal and vertical directions.

Specifically, the neighboring region 40 may only be a region that is a range of the certain angle θ toward the outside of the first object 30A in the scanning direction Q of the sensor 10B.

Therefore, when the scanning direction Q of the sensor 10B is horizontal, the neighboring region 40 may only be a region that is a range of the certain angle θ from the reference straight line F toward the outside of the first object 30A in the horizontal direction. When the scanning direction Q of the sensor 10B is vertical, the neighboring region 40 may only be a region that is a range of the certain angle θ from the reference straight line F toward the outside of the first object 30A in the vertical direction.

When the sensor 10B has a plurality of scanning directions Q, the neighboring region 40 may only be a region that is a range of the certain angle θ from the reference straight line F toward the outside of the first object 30A in each of these directions. For example, the neighboring region 40 may be a region sandwiched between: the reference straight line F passing through the sensor 10B and the corresponding end point E on each of the first faces spreading along the respective scanning directions Q or on the second face; and a straight line F' indicating the certain angle θ from the reference straight line F toward the outside of the first object 30A.

Figure 5A:
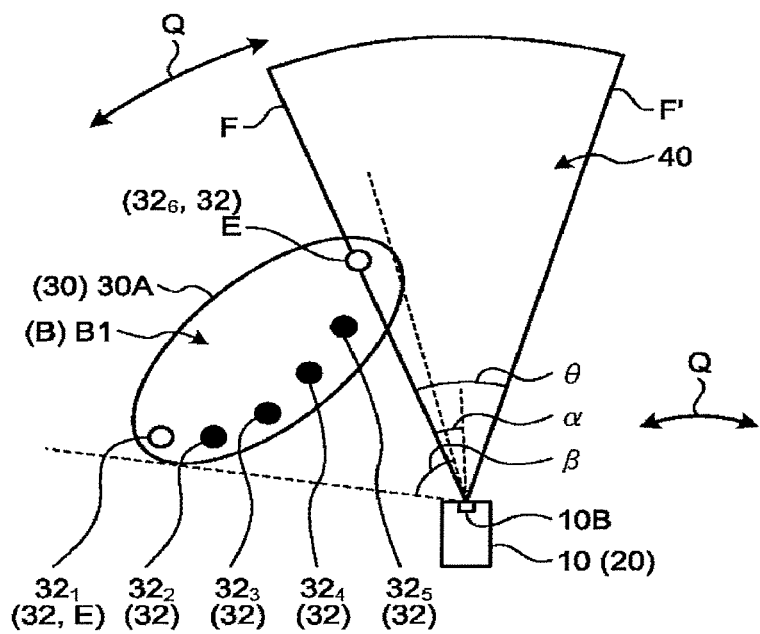
FIGS. 5A to 5C illustrate details of the neighboring region.
Figure 5B:
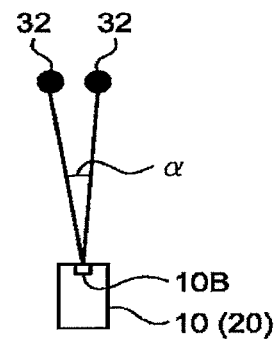
Figure 5C:
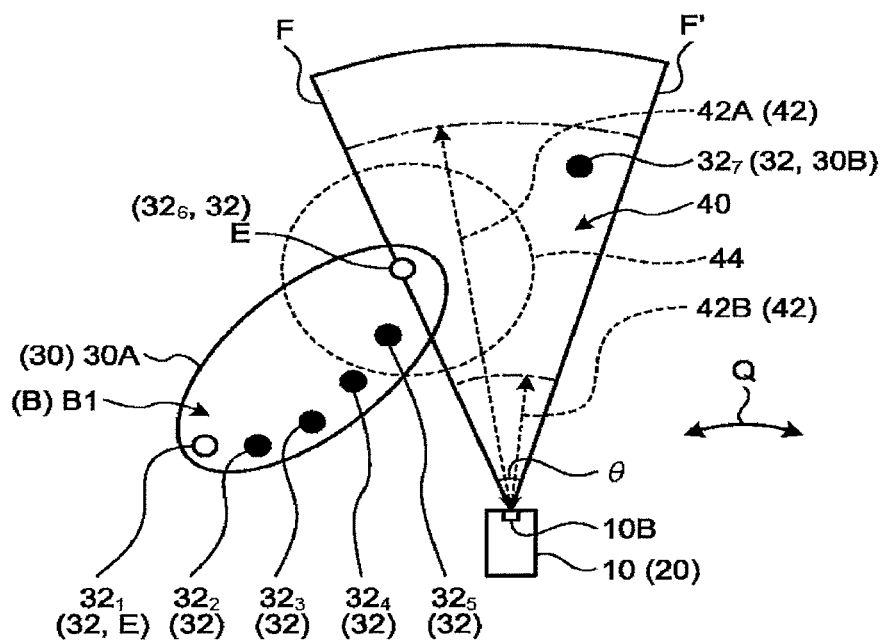

FIGS. 5A to 5C illustrate details of the neighboring region 40. The certain angle θ may only be an angle larger than zero.

As illustrated in FIG. 5A, the certain angle θ is preferably at least an angle α representing the detection limit of the sensor 10B with respect to the points 32. The angle α, which represents the detection limit of the sensor 10B, represents the minimum angle at which the points 32 can be detected by the sensor 10B as illustrated in FIG. 5B.

The certain angle θ is preferably smaller than or equal to an angle representing the size of the first object 30A in the scanning direction Q of the sensor 10B. Specifically, as illustrated in FIG. 5A, the angle representing the size of the first object 30A in the scanning direction Q of the sensor 10B is represented by an angle β. The angle β is an angle formed by two straight lines connecting the sensor 10B to the respective ends (two end points E (the points $32_1$ and $32_6$)), in the scanning direction Q, of the first object 30A.

That is, the setting unit 20F derives the certain angle θ according to the size of the first object 30A from which the end points E have been specified.

Specifically, first of all, the setting unit 20F derives the angle β, which represents the size of the first object 30A from which the end points E have been specified. The setting unit 20F may only derive the angle β, which represents the size of the first object 30A, by use of positional information on the paired end points E that represent the points 32 at the respective ends, in the scanning direction Q, detected by the detector 20E from the point cluster B1 that represents the first object 30A. The setting unit 20F then derives the certain angle θ that is larger than or equal to the angle α, which represents the detection limit of the sensor 10B, and that is smaller than or equal to the angle β, which represents the size of the first object 30A. The setting unit 20F may derive the angle β from the previously determined size of the first object 30A that is served as an object to be detected. For example, when another vehicle serves as an object to be detected, the setting unit 20F may only use the angle β derived from a previously determined size of a general vehicle.

As described above, the detector 20E detects a plurality of end points E for each of the first objects 30A. Therefore, for each of the detected end points E, the setting unit 20F derives the certain angle θ according to the size of the corresponding first object 30A.

The setting unit 20F then sets, as the neighboring region 40 for each of the end points E of the first object 30A, a range of the certain angle θ from the corresponding reference straight line F toward the outside of the first object 30A.

That is, the setting unit 20F sets, as the neighboring region 40 for each of the end points E, a range of the certain angle θ that is larger than or equal to the angle α, which represents the detection limit of the sensor 10B for the points 32, and that is smaller than or equal to the angle β, which represents the size of the first object 30A in the scanning direction Q of the sensor 10B.

That is, the setting unit 20F may set, as the neighboring region 40 for each of the end points E, a range of the certain angle θ that is smaller than or equal to the angle β, which represents the size of the first object 30A, and that is N times (N is an integer at least 1) as large as the angle α, which represents the detection limit of the sensor 10B for the points 32.

The setting unit 20F may set a further limited region as the neighboring region 40. For example, the setting unit 20F may set, as the neighboring region 40, a region obtained by further constraining the region between: the reference straight line F passing through the sensor 10B and the corresponding end point E on each of the first faces spreading along the respective scanning directions Q or on the second face; and a line at the certain angle θ from the reference straight line F toward the outside of the first object 30A in a projection view thereof on the two-dimensional plane. The descriptions below refer to FIG. 5C. The setting unit 20F may set, as the neighboring region 40, a region within a range of the certain angle θ from the reference straight line F toward the outside of the first object 30A, the region overlapping at least one of: a region the distance to which from the information processing apparatus 20 is within a first range 42; and a region the distance to which from the end point E is within a second range 44.

The first range 42 is, within the range of the certain angle θ from the reference straight line F toward the outside of the first object 30A, a range the distance to which from the information processing apparatus 20 is larger than or equal to a distance 42B and smaller than or equal to a distance 42A that is larger than the distance 42B. The distance from the information processing apparatus 20 more precisely refers to the distance from the sensor 10B.

The distance 42B may only take a value larger than 0 and smaller than the distance from the sensor 10B to the end point E (the point $32_6$). The distance 42A may only take a value larger than the distance from the sensor 10B to the end point E (the point $32_6$) and smaller than or equal to the maximum detectable distance of the sensor 10B.

The second range 44 is a range within a circle having a particular radius and centered at the end point E (the point $32_6$). This particular radius may only be larger than 0 and smaller than or equal to a previously determined value. As the maximum value of this particular radius, a value such that an angle of the circle as viewed from the sensor 10B can be smaller than either the angle β or the angle α and the angle that is N times as large as the angle α may only be previously determined, for example.

Preferably, the setting unit 20F sets larger ranges as the first range 42 and the second range 44 when the distance between the information processing apparatus 20 and the end point E is larger. More precisely, the setting unit 20F sets larger ranges as the first range 42 and the second range 44 when the distance between the sensor 10B and the end point E is larger.

This embodiment is further described with reference back to FIG. 2. The specifier 20G is described next. If the second object 30B more distant than one of the end points E from the information processing apparatus 20 is present in the neighboring region 40 of that end point E, the specifier 20G specifies that end point E as the reference point S of the first object 30A. More precisely, if the point cluster B2 of the second object 30B at least partially more distant than the end points E from the information processing apparatus 20 is present in the neighboring region 40 of the end point E, the specifier 20G specifies that end point E as the reference point S of the first object 30A.

The descriptions below refer to FIG. 4. For example, the detector 20E is assumed to have detected the points $32_6$ and $32_1$ as the end points E of the first object 30A. The setting unit 20F is assumed to have then set the neighboring region 40 for the point $32_6$ detected as one of the end points E. The setting unit 20F is assumed to have further set a neighboring region 40' as the neighboring region 40 for the point $32_1$ detected as the other end point E.

In this case, the specifier 20G performs the following process with respect to each of the end points E (the points $32_6$ and $32_1$) detected on the first object 30A.

For example, the specifier 20G determines whether the second object 30B more distant than one of the end points E (the point $32_6$) from the information processing apparatus 20 is present in the neighboring region 40 determined for one of the end points E (the point $32_6$). For example, the specifier 20G reads out the distance from the information processing apparatus 20 (the sensor 10B) to the end point E (the point $32_6$) as indicated by the positional information on the end point E (the point $32_6$). The specifier 20G specifies, among all of the points 32 forming the point cluster B2 of the second object 30B, any points 32 present within the neighboring region 40 of the end point E (the point $32_6$). The specifier 20G then reads out, with respect to each of the specified points 32 of the second object 30B, the distance from the sensor 10B to the point 32 as indicated by the positional information. The specifier 20G determines whether any point 32, the distance to which from the sensor 10B is larger than the distance of the end point E (the point $32_6$) from the sensor 10B, is included among the points 32 of the second object 30B in the neighboring region 40. If such a point 32 is included, the specifier 20G determines that the second object 30B more distant than the end points E (the point $32_6$) from the information processing apparatus 20 is present in the neighboring region 40 determined for the end points E (the point $32_6$).

Subsequently, upon determining that the second object 30B more distant than the end points E from the information processing apparatus 20 is present in the neighboring region 40 of that end point E (the point $32_6$), the specifier 20G specifies the end point E as the reference point S of the first object 30A.

Here, the specifier 20G performs the above process with respect to each of the end points E (the points $32_6$ and $32_1$) detected for the first object 30A. Thus, two or more such end points E may be specified as the reference points S.

The specifier 20G may specify those two or more reference points S or may specify one of those reference points S as the final reference point S.

For example, if two or more of the end points E detected by the detector 20E reference points can be specified as the reference points S, the specifier 20G may only determine, as the single reference point S, one of the end points E that corresponds to the neighboring region 40 having the smallest area among the neighboring regions 40 used for the specification.

For example, the point $32_7$ that constitutes one of the second objects 30B and that is more distant than one of the end points E (the point $32_6$) from the sensor 10B is assumed to be present within the neighboring region 40 of this end point E (the point $32_6$) of the first object 30A as illustrated in FIG. 4. The point $32_{11}$ that constitutes another one of the second objects 30B and that is more distant than another one of the end points E (the point $32_1$) from the sensor 10B is further assumed to be present within the neighboring region 40' of this end point E (the point $32_1$) of the first object 30A. In this case, the specifier 20G can specify these two end points E (the points $32_1$ and $32_6$) as the reference points S.

It is further assumed that the neighboring region 40 of the end point E (the point $32_6$) is narrower than the neighboring region 40' of the end point E (the point $32_6$).

In this case, the specifier 20G may only specify, as the single reference point S, the end point E (the point $32_6$) that corresponds to the narrower neighboring region 40.

If the second object 30B more distant than one of the end points E from the information processing apparatus 20 is not present in the neighboring region 40 set for one of the end points E, the specifier 20G does not specify this end point E as the reference point S.

This embodiment is further described with reference back to FIG. 2. The output controller 20H is described next. The output controller 20H outputs the output information that indicates the reference point S of the object 30.

The output information includes, at least, information indicating the reference point S of the object 30. For example, the output information includes positional information on the reference point S specified for each of the objects 30. The output information may further includes at least one of the following attributes that has been derived based on the reference point S: the moving direction of the object 30; the moving distance of the object 30; the moving speed of the object 30; the shape of the object 30; and the position of the object 30.

In such a case, the output controller 20H may only derive at least one of the moving direction, the moving distance, the moving speed, the shape, and the position of each of the objects 30 by use of a well-known method, based on: the positional information calculated for that object 30 on the corresponding reference point S; and the positional information on the points 32 that form the point cluster B corresponding to that object 30.

For example, the output controller 20H uses the reference points S specified based on the points 32 acquired by the sensor 10B at different acquisition times, so that the moving direction, the moving speed, the shape, and the moving distance of the objects 30 are derived using the positional change of the reference point S and a time taken for the positional change.

For example, the output controller 20H may only derive the shape of the object 30 by finding a previously determined shape model for the object 30 that matches up with the point clusters B that constitute the object 30.

For example, the output controller 20H may derive the position of the object 30 by positioning, with the reference point S, a previously determined shape model that matches up with the point clusters B that constitute the object 30. Furthermore, when two or more such reference points S can be specified for one of the objects 30, the output controller 20H may derive the position corresponding to the center of these reference points S as the position of the object 30.

The position of the object 30 may be expressed as world coordinates or relative coordinates with respect to the moving object 10 and as rectangular coordinates or polar coordinates.

The output information may further include other information.

The output controller 20H outputs the output information to at least one of the output unit 10A, the power controller 10G, and the storage 20B.

For example, the output controller 20H outputs the output information to the output unit 10A. For example, upon receiving the output information, the communication unit 10D of the output unit 10A transmits the output information to an external apparatus or the like. For example, the display 10E of the output unit 10A displays the output information. For example, the loudspeaker 10F of the output unit 10A outputs sound according to the output information. The sound according to the output information may be a voice indicating the output information or an alarm according to the output information.

For example, the output controller 20H outputs the output information to the power controller 10G. As described above, the power controller 10G controls the power unit 10H of the moving object 10. Upon receiving the output information, the power controller 10G determines the conditions of the surroundings based on the output information and information obtained from the sensor 10B, and controls variables such as acceleration level, braking pressure level, and steering angle. For example, the power controller 10G performs control so that the moving object 10 can keep the current lane while avoiding obstacles and keep being at least a certain distance apart from a vehicle in front thereof.

The output controller 20H may store the output information in the storage 20B. The output controller 20H may output the output information to another processing functional unit (for a function to perform processing such as collision determination and motion prediction).

An example of a procedure to be executed by the information processing apparatus 20 in this embodiment is described next. FIG. 6 is a flowchart illustrating the example of the procedure to be executed by the information processing apparatus 20 in this embodiment is described next.

First of all, the acquirer 20C acquires respective pieces of positional information on a plurality of points 32 surrounding the moving object 10 (Step S100).

Subsequently, the grouping unit 20D groups, into point clusters B that constitute respective objects 30, the points 32 on which the positional information has been obtained at Step S100 (Step S102).

Subsequently, on a first object 30A among the objects 30, the detector 20E detects end points E of the first object 30A (Step S104).

Subsequently, the setting unit 20F sets a neighboring region 40 for each of the end points E of the first object 30A (Step S106).

Subsequently, the specifier 20G determines whether any second object 30B is present within the neighboring region 40 set at Step S106, the second object 30B being more distant than each of the end points E of the first object 30A that have been detected at Step S104 is (Step S108). This routine ends if the determination at Step S108 is negative (No at Step S108). If any such second object 30B has been determined to be present (Yes at Step S108), this routine proceeds to Step S110.

At Step S110, the specifier 20G specifies, as a reference point S of the first object 30A, at least one of the end points E detected at Step S104 (Step S110).

Subsequently, the output controller 20H generates output information on the reference point S specified at Step S110 (Step S112). Subsequently, the output controller 20H outputs the output information generated at Step S112 (Step S114). This routine thereby comes to an end.

As described above, the information processing apparatus 20 in this embodiment includes the detector 20E and the specifier 20G. The detector 20E detects the end points E of the point cluster B that constitutes the first object 30A. If the second object 30B more distant than one of the end points E from the information processing apparatus 20 is present in the neighboring region 40 of that end point E, the specifier 20G specifies that end point E as the reference point S of the first object 30A.

For this specification, the end point that is not behind another object is simply used as the reference point in the conventional technique. In the conventional technique, a true end point E cannot be detected if: the point 32 near an actual end of the first object 30A has not been detected; and any one of the points 32 that is not near the actual end and has been detected is not behind any other objects. The conventional technique therefore occasionally can result in reduced accuracy in specifying the reference point S.

In contrast, the information processing apparatus 20 in this embodiment specifies any one of the end points E of the first object 30A as the reference point S if another object 30 (the second object 30B) more remote than the end point E from the information processing apparatus 20 is present within the neighboring region 40 of the end point E of the first object 30A.

If the second object 30B, that is, an object 30 other than the first object 30A is present within the neighboring region 40 of the end point E, the end point E is highly likely a true end point E of the first object 30A. Therefore, the information processing apparatus 20 in this embodiment is capable of: excluding any of the points 32 that would conventionally be highly likely determined as a false end point E for reasons such as failure to acquire the point 32 that is near the actual end of the first object 30A; and specifying, as the reference point S, the point 32 that is highly likely a true end point E.

The moving object 10 in this embodiment is therefore capable of specifying the reference point S of the object 30.

Second Embodiment

This embodiment describes an implementation for correcting the reference point S specified by the specifier 20G.

FIG. 1 illustrates an example of a moving object 11 of this embodiment. The moving object 11 includes the output unit 10A, the sensor 10B, the input device 10C, the power controller 10G, the power unit 10H, and an information processing apparatus 22. The moving object 11 is identical to the moving object 10 except that it includes the information processing apparatus 22 instead of the information processing apparatus 20.

Figure 7:
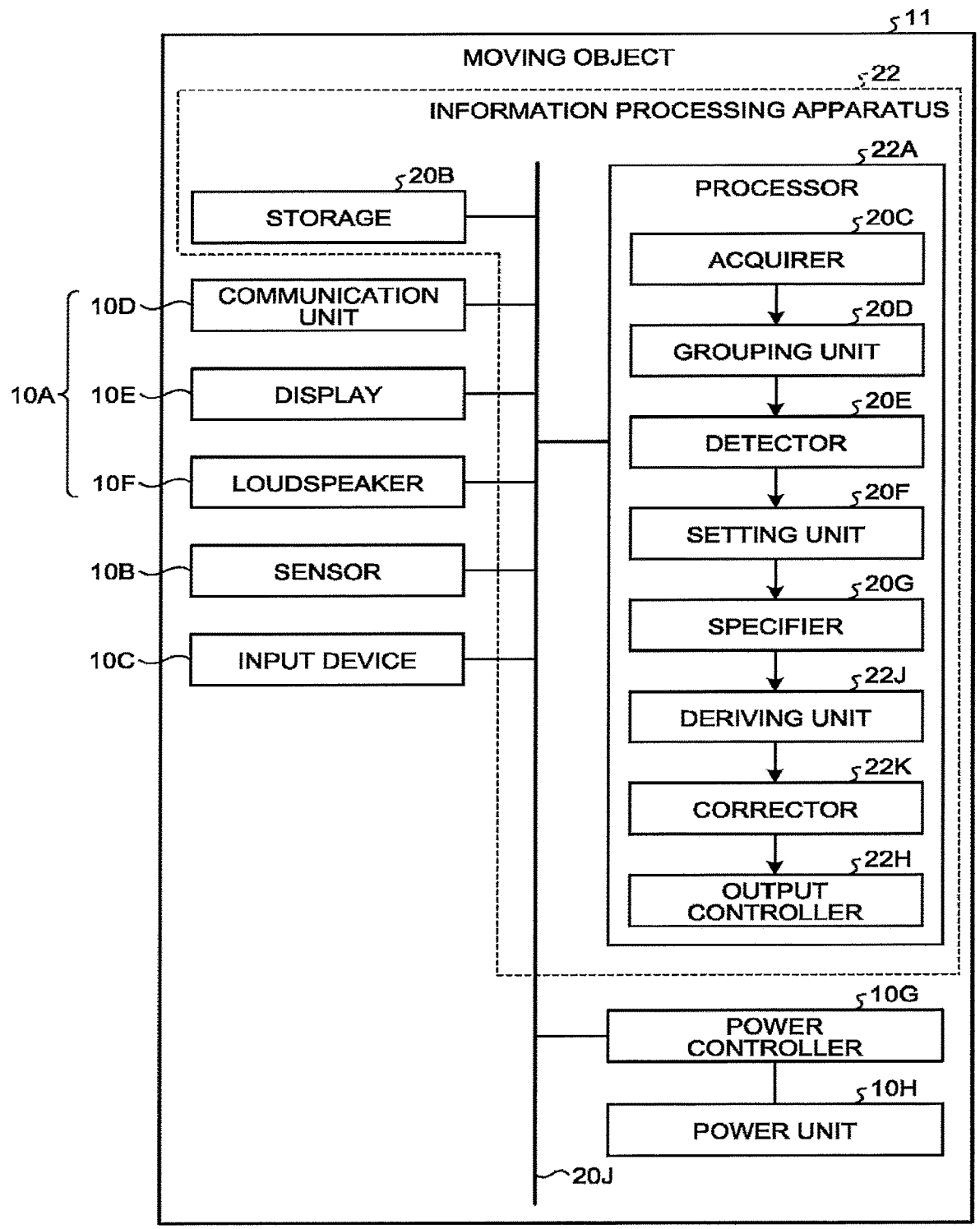
FIG. 7 is a block diagram illustrating an example of the configuration of the information processing apparatus.

FIG. 7 is a block diagram illustrating an example of the configuration of the information processing apparatus 22.

The information processing apparatus 22 includes a processor 22A, the storage 20B, the output unit 10A, the sensor 10B, and the input device 10C. For example, the output unit 10A includes the communication unit 10D, the display 10E, and the loudspeaker 10F as described above.

The information processing apparatus 22 is identical to the information processing apparatus 20 in the first embodiment except that it includes the processor 22A instead of the processor 20A.

The processor 22A includes the acquirer 20C, the grouping unit 20D, the detector 20E, the setting unit 20F, the specifier 20G, a deriving unit 22J, a corrector 22K, and an output controller 22H.

The acquirer 20C, the grouping unit 20D, the detector 20E, the setting unit 20F, and the specifier 20G are the same as those in the first embodiment. That is, the processor 22A includes the deriving unit 22J and the corrector 22K in addition to the functional units included in the processor 20A in the first embodiment, and includes the output controller 22H instead of the output controller 20H.

Based on the neighboring region 40 used by the specifier 20G to specify the reference point S, the deriving unit 22J derives a correction range within which a corrected reference point S can be set.

Here, the point cluster B that constitutes the first object 30A and includes the reference point S specified by the specifier 20G can include none of the points 32 that need to be detected of the first object 30A.

Figure 8:
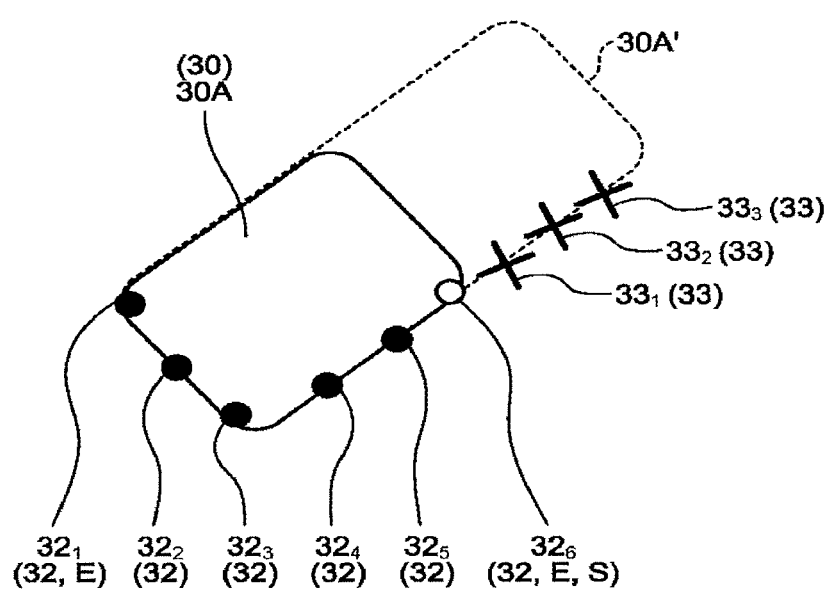
FIG. 8 illustrates an example of points.

FIG. 8 illustrates an example of the points 32. For example, depending on conditions, laser light L emitted from the sensor 10B can be reflected not toward the sensor 10B or turn into a reflected light having an extremely attenuated intensity, the conditions including the material, the color, and the outer surface shape of the actual first object 30A, the positional relation between the sensor 10B and the actual first object 30A, and the detection environment. In such a case, the surface of the actual first object 30A can include the point 32 that would have been detected under favorable detection conditions and that has not been detected by the sensor 10B.

For example, it is assumed that points on an actual outer contour 30A' of the first object 30A include undetected points 33 ($33_1$ to $33_3$) as illustrated in FIG. 8. However, depending on detection conditions, only the points 32 (for example, the points $32_1$ to $32_6$) on a part of the outer surface of the first object 30A can be detected without the undetected points 33 ($33_1$ to $33_3$) detected.

In this case, it can be preferable that the position of the reference point S be corrected because the end point E among the detected points 32 (the points $32_1$ to $32_6$) is specified as the reference point S depending on the second object 30B.

In consideration of this point, this embodiment provides the deriving unit 22J that, based on the neighboring region 40 used by the specifier 20G to specify the reference point S, derives a correction range within which a corrected reference point S can be set.

FIGS. 9A to 9D illustrate examples of a correction range 60. The correction range 60 refers to a region to which the position of the reference point S can be shifted. In other words, the correction range 60 is a range of a position applicable to the reference point S.

Figure 9A:
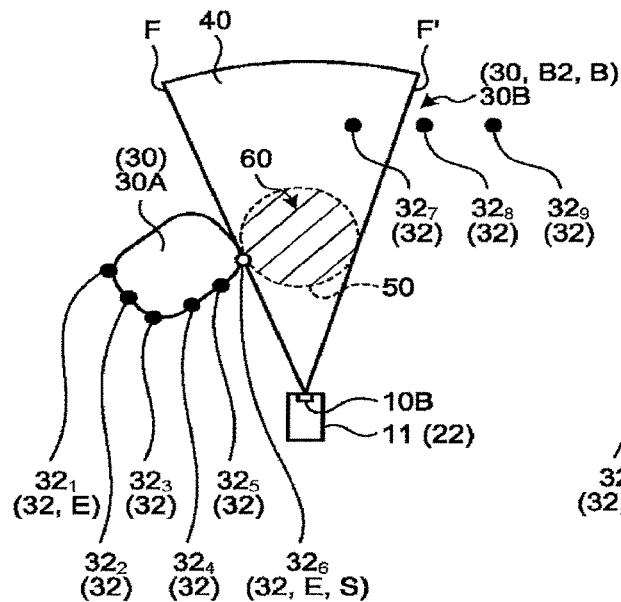
FIGS. 9A to 9D illustrate examples of a correction range.

For example, as illustrated in FIG. 9A, the deriving unit 22J sets an overlapping region of the neighboring region 40 and a first circle 50 as the correction range 60. The first circle 50 is a circle inscribed to: the reference point S to be corrected; and at least a part of the periphery of the neighboring region 40 that has been used to specify that reference point S. The periphery of the neighboring region 40 is a line indicating the outer frame of the neighboring region 40. The first circle 50 is a circle contained in the neighboring region 40. That is, the first circle 50 is a partial region of the neighboring region 40.

Specifically, the neighboring region 40 is assumed to be a region sandwiched between two straight lines extending from the sensor 10B that are: the reference straight line F passing through the sensor 10B and the end point E (the point $32_6$); and a straight line F' indicating the certain angle θ from the reference straight line F to the outside of the first object 30A. In this case, the first circle 50 is a circle inscribed to the reference straight line F, the reference point S (the point $32_6$) on the reference straight line F, and the straight line F'.

The deriving unit 22J may derive a different range as the correction range 60.

Figure 9B:
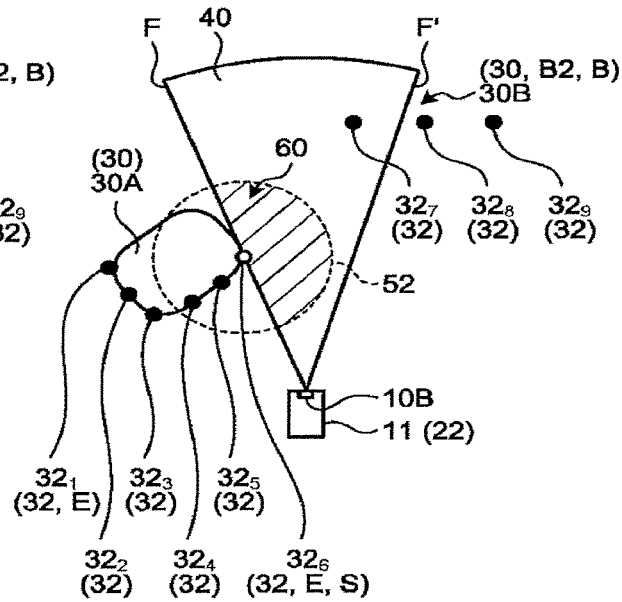

For example, as illustrated in FIG. 9B, the deriving unit 22J may derive an overlapping region of the neighboring region 40 and a second circle 52 as the correction range 60. The second circle 52 is a circle having a second radius and centered at the reference point S. This second radius may only be larger than or equal to the above angle α or an angle N times as large as the angle α and smaller than or equal to the above angle β.

Figure 9C:
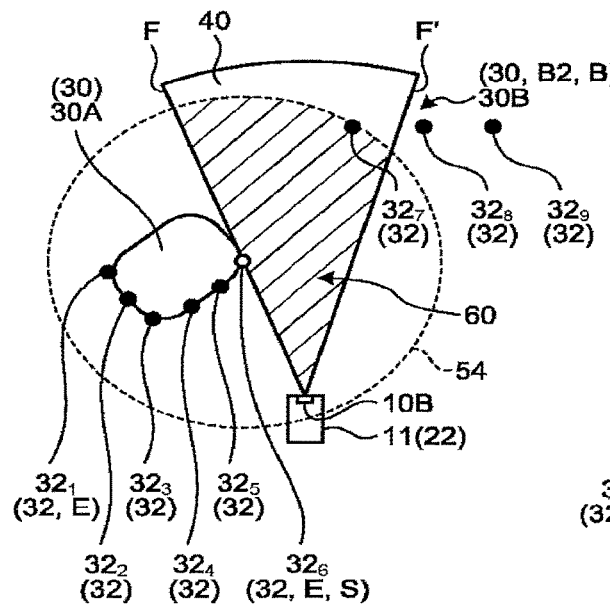

For example, as illustrated in FIG. 9C, the deriving unit 22J may derive an overlapping region of the neighboring region 40 and a third circle 54 as the correction range 60. The third circle 54 is a circle centered at the reference point S and having a radius equal to the distance from the reference point S to each of the points 32 that constitute the second object 30B. In the configuration illustrated in FIG. 9C, the radius is the distance between the reference point S (the point $32_6$) and each of the points $32_7$ to $32_9$ constituting the second object 30B. In FIG. 9C, the third circle 54 that has a radius equal to the distance from the reference point S to the points $32_7$ constituting the second object 30B and that is centered at the reference point S (the point $32_6$) is illustrated as an example.

Figure 9D:
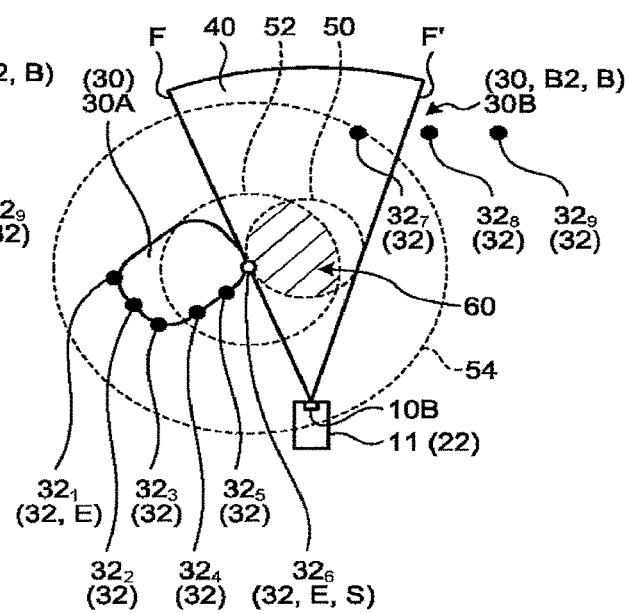

For example, as illustrated in FIG. 9D, the deriving unit 22J may derive an overlapping region of the neighboring region 40 and at least one of the first circle 50, the second circle 52, and the third circle 54 as the correction range 60.

This embodiment is further described with reference back to FIG. 7. The corrector 22K corrects the position of the reference point S specified by the specifier 20G to a position within the correction range 60 derived by the deriving unit 22J.

For example, the corrector 22K corrects the position of the reference point S specified by the specifier 20G into a position within the correction range 60 derived by the deriving unit 22J.

Specifically, the correction range 60 is assumed to be a region where the neighboring region 40 and the first circle 50 overlap each other (see FIG. 9A). In this case, the corrector 22K corrects the reference point S (the point $32_6$) into the position at the center of the first circle 50, which is the correction range 60.

The corrector 22K may correct the position of the reference point S using the respective correction ranges 60 corresponding to different timings. The respective correction ranges 60 corresponding to different timings means the correction ranges 60 derived from the reference points S specified based on the points 32 in respective sets acquired by the sensor 10B at different timings.

The corrector 22K then outputs positional information on the corrected reference point S to the output controller 22H.

The output controller 22H uses the reference point S corrected by the corrector 22K, instead of the reference point S specified by the specifier 20G, for generation of the output information. The output controller 22H is the same as the output controller 20H in the first embodiment except for this point.

The output controller 22H may generate the output information that includes information indicating the correction range 60 that has been used for correction into the corrected reference point S.

Figure 10:
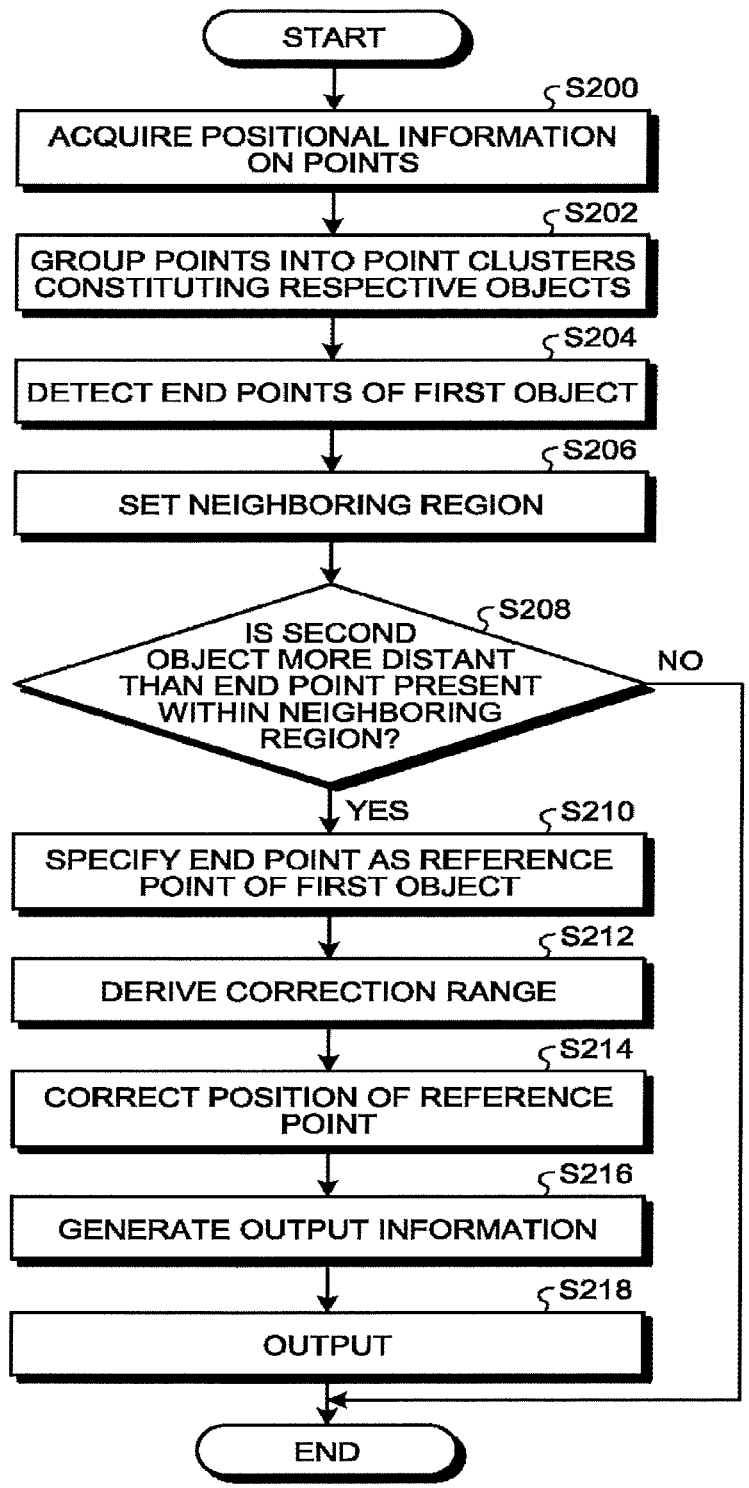
FIG. 10 is a flowchart illustrating an example of a procedure for information processing.

An example of a procedure to be executed by the information processing apparatus 22 in this embodiment is described next. FIG. 10 is a flowchart illustrating the example of the procedure to be executed by the information processing apparatus 22 in this embodiment is described next.

The information processing apparatus 22 executes Steps S200 to S210 in the same manner as Steps S100 to S110 (see FIG. 6) that are executed by the information processing apparatus 20 in the first embodiment.

Specifically, first of all, the acquirer 20C acquires respective pieces of positional information on a plurality of points 32 surrounding the moving object 11 (Step S200). Subsequently, the grouping unit 20D groups, into point clusters B that constitute respective objects 30, the points 32 on which the positional information has been obtained at Step S200 (Step S202). Subsequently, on a first object 30A among the objects 30, the detector 20E detects end points E of the first object 30A (Step S204). Subsequently, the setting unit 20F sets a neighboring region 40 for each of the end points E of the first object 30A (Step S206).

Subsequently, the specifier 20G determines whether any second object 30B is present within the neighboring region 40 set at Step S206, the second object 30B being more distant than each of the end points E of the first object 30A that have been detected at Step S204 is (Step S208). This routine ends if the determination at Step S208 is negative (No at Step S208). If any such second object 30B has been determined to be present (Yes at Step S208), this routine proceeds to Step S210.

At Step S210, the specifier 20G specifies, as a reference point S of the first object 30A, at least one of the end points E detected at Step S204 (Step S210).

Subsequently, the deriving unit 22J derives a correction range 60 for the reference point S (Step S212). Subsequently, the corrector 22K corrects the position of the reference point S specified at Step S210 to a position within the correction range 60 derived at Step S212 (Step S214).

Subsequently, the output controller 22H generates output information using the reference point S corrected at Step S214 (Step S216). Subsequently, the output controller 22H outputs the output information generated (Step S218). This routine thereby comes to an end.

As described above, in the information processing apparatus 22 in this embodiment, the corrector 22K corrects the position of the reference point S specified by the specifier 20G to a position within the correction range 60.

The information processing apparatus 22 in this embodiment is therefore capable of specifying the reference point S of the object 30 with accuracy further improved from the first embodiment.

Hardware Configuration

Figure 11:
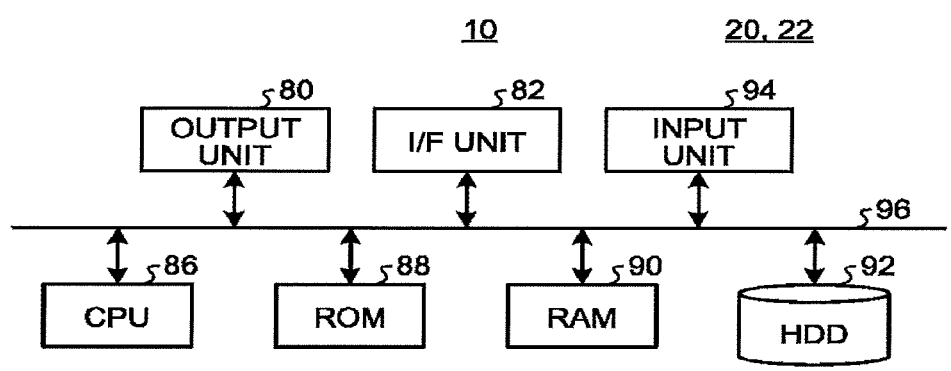
FIG. 11 illustrates a hardware configuration.

An example of the hardware configuration applicable to the information processing apparatus 20 and the information processing apparatus 22 in the above embodiments is described next. FIG. 11 illustrates an example of the hardware configuration applicable to the information processing apparatus 20 and the information processing apparatus 22 in the above embodiments.

The information processing apparatus 20 and the information processing apparatus 22 in the above embodiments each include a controller such as a central processing unit (CPU) 86, storages such as a read only memory (ROM) 88, a random access memory (RAM) 90, and a hard disk drive (HDD) 92, an interface (I/F) unit 82 serving as an interface with various devices, an output unit 80 to output various kinds of information such as the output information, an input unit 94 to receive operations from a user, and a bus 96 connecting these units to one another, that is, each have a hardware configuration using a regular computer.

In each of the information processing apparatus 20 and the information processing apparatus 22 in the above embodiments, the CPU 86 loads a computer program into the RAM 90 from the ROM 88, so that each of the above functions is implemented on a computer.

A computer program for executing the above processing to be executed in each of the information processing apparatus 20 and the information processing apparatus 22 in the above embodiments may be stored in the HDD 92. A computer program for executing the above processing to be executed in each of the information processing apparatus 20 and the information processing apparatus 22 in the above embodiments may be previously incorporated in the ROM 88 to be provided.

A computer program for executing the above processing to be executed in the information processing apparatus 20 and the information processing apparatus 22 in the above embodiments may be stored, as a file in an installable or executable format, in a computer-readable storage medium such as a compact disc read-only memory (CD-ROM), a compact disc recordable (CD-R), a memory card, a digital versatile disk (DVD), or a flexible disk (FD) and be provided as a computer program product. A computer program for executing the above processing to be executed in each of the information processing apparatus 20 and the information processing apparatus 22 in the above embodiments may be stored on a computer connected to a network such as the Internet and be provided by being downloaded via the network. A computer program for executing the above processing to be executed in each of the information processing apparatus 20 and the information processing apparatus 22 in the above embodiments may be provided or distributed via a network such as the Internet.

According to the information processing apparatus, the moving object, and the information processing method of at least one embodiment described above, it is possible to highly accurate specification of a reference point of an object.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus specifying a reference point of an object, the apparatus comprising:
    one or more processors configured to:
    detect, from among a plurality of points constituting a point cluster that is a cluster of reflection points of laser light reflected by a first object, each of points located at respective ends in a scanning direction of a sensor emitting the laser light, as an end point; and
    specify the end point as the reference point used to derive a position or a moving speed of the first object when at least part of a point cluster that constitutes a second object is present within a neighboring region of the end point, the part of the point cluster being more distant than the end point from the information processing apparatus, and
    not specify the end point as the reference point of the first object when at least the part of the point cluster that constitutes the second object is not present.

2. The information processing apparatus according to claim 1, wherein the one or more processors are configured to
    acquire positional information on a plurality of points surrounding the apparatus;
    group the plurality of points into each point cluster constituting an object including the first object and the second object; and
    specify the end point as the reference point of the first object when at least part of a point cluster that constitutes the second object is present within the neighboring region of the end point, the part being more distant than the end point from the information processing apparatus.

3. The information processing apparatus according to claim 1, wherein the one or more processors are configured to
    set the neighboring region of the end point; and
    specify the end point as the reference point of the first object when the second object that is more distant than the end point from the apparatus is present within the set neighboring region.

4. The information processing apparatus according to claim 3, wherein the one or more processors are configured to set, as the neighboring region, a range of a certain angle from a reference straight line toward the outside of the first object, the reference straight line passing through the apparatus and the end point.

5. The information processing apparatus according to claim 4, wherein the neighboring region is a range of the certain angle from the reference straight line toward the outside of the first object in at least one of a horizontal direction and a vertical direction.

6. The information processing apparatus according to claim 4, wherein the one or more processors are configured to set, as the neighboring region, a range of the certain angle that is larger than or equal to an angle representing a acquirement limit of a sensor in acquiring a plurality of points surrounding the apparatus and that is smaller than or equal to a size of the first object in a scanning direction of the sensor.

7. The information processing apparatus according to claim 4, wherein the one or more processors are configured to set a region within a range of the certain angle as the neighboring region, the region overlapping at least one of a region within which a distance from the apparatus is within a first range and a region within which a distance from the end point is within a second range.

8. The information processing apparatus according to claim 7, wherein the one or more processors are configured to set larger ranges as the first and the second ranges when the apparatus and the corresponding end point are more distant from each other.

9. The information processing apparatus according to claim 1, wherein the one or more processors are configured to output information indicating the reference point.

10. The information processing apparatus according to claim 9, wherein the one or more processors are configured to control a power unit of a moving object using the output information.

11. The information processing apparatus according to claim 1, wherein the one or more processors are configured to output information including at least one of a moving direction, a moving distance, a moving speed, a shape, and a position of the first object, each of which is derived based on the reference point.

12. The information processing apparatus according to claim 1, wherein the one or more processors are configured to, when a plurality of end points are each applicable as the reference point, specify one of the plurality of end points as the reference point, the one of the plurality of end points corresponding to the neighboring region that has a smallest area among neighboring regions each of which is used to specify each of the plurality of end points.

13. The information processing apparatus according to claim 1, wherein the one or more processors are configured to
derive a correction range based on the neighboring region that is used to specify the reference point, the correction region being a region within which a corrected reference point is settable; and
correct a position of the reference point to a position within the derived correction range.

14. The information processing apparatus according to claim 13, wherein the one or more processors are configured to derive, as the correction range, an overlapping region of a first circle and the neighboring region, the first circle being tangent with the reference point and a periphery of the neighboring region.

15. The information processing apparatus according to claim 14, wherein the one or more processors are configured to correct the position of the reference point to a position at the center of the correction range.

16. The information processing apparatus according to claim 14, wherein the one or more processors are configured to derive, as the correction range, an overlapping region of the neighboring region and at least one of the first circle, a second circle, and a third circle, the second circle being centered at the reference point and having a certain radius, the third circle being centered at the reference point and having a radius that is equal to a distance from the reference point to a point of the second object.

17. A moving object comprising the information processing apparatus according to claim 1.

18. An information processing method implemented by an information processing apparatus specifying a reference point of an object, the method comprising:
detecting, from among a plurality of points constituting a point cluster that is a cluster of reflection points of laser light reflected by a first object, each of points located at respective ends in a scanning direction of a sensor emitting the laser light, as an end point; and
specifying the end point as the reference point used to derive a position or a moving speed of the first object when at least a part of a point cluster that constitutes a second object is present within a neighboring region of the end point, the part of the point cluster being more distant than the end point from an information processing apparatus, and
not specifying the end point as the reference point of the first object when at least the part of the point cluster that constitutes the second object is not present.

19. A computer program product having a non-transitory computer-readable medium including programmed instructions for specifying a reference point of an object, wherein the instructions, when executed by a computer, cause the computer to perform:
detecting, from among a plurality of points constituting a point cluster that is a cluster of reflection points of laser light reflected by a first object, each of points located at respective ends in a scanning direction of a sensor emitting the laser light, as an end point; and
specifying the end point as the reference point used to derive a position or a moving speed of the first object when at least a part of a point cluster that constitutes a second object is present within a neighboring region of the end point, the part of the point cluster being more distant than the end point from an information processing apparatus, and
not specifying the end point as the reference point of the first object when at least the part of the point cluster that constitutes the second object is not present.

* * * * *